(12) United States Patent
Fan Jiang et al.

(10) Patent No.: US 7,692,743 B2
(45) Date of Patent: Apr. 6, 2010

(54) TRANSFLECTIVE LIQUID CRYSTAL DISPLAY PANEL AND PIXEL STRUCTURE THEREOF

(75) Inventors: Shih-Chyuan Fan Jiang, Hsin-Chu (TW); Ping-Ju Jiang, Hsin-Chu (TW); Hsiang-Lin Lin, Hsin-Chu (TW); Ching-Huan Lin, Hsin-Chu (TW); Chih-Ming Chang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 461 days.

(21) Appl. No.: 11/844,356

(22) Filed: Aug. 24, 2007

(65) Prior Publication Data
US 2009/0002611 A1 Jan. 1, 2009

(30) Foreign Application Priority Data
Jun. 26, 2007 (TW) ............................... 96123066 A

(51) Int. Cl.
*G02F 1/1335* (2006.01)
*G02F 1/1343* (2006.01)
(52) U.S. Cl. ..................... 349/114; 349/38; 349/147
(58) Field of Classification Search .................. 349/38, 349/114, 147
See application file for complete search history.

(56) References Cited
U.S. PATENT DOCUMENTS

| 5,604,358 | A | * | 2/1997 | Kim | 257/59 |
|---|---|---|---|---|---|
| 5,920,083 | A | * | 7/1999 | Bae | 257/59 |
| 5,936,685 | A | | 8/1999 | Ito | |
| 6,633,359 | B1 | * | 10/2003 | Zhang et al. | 349/141 |
| 6,717,634 | B2 | * | 4/2004 | Kim et al. | 349/54 |
| 7,023,508 | B2 | * | 4/2006 | You | 349/113 |
| 7,212,266 | B2 | * | 5/2007 | Tashiro et al. | 349/114 |
| 7,274,420 | B2 | * | 9/2007 | You | 349/114 |
| 7,280,174 | B2 | * | 10/2007 | Park et al. | 349/114 |
| 7,298,430 | B2 | * | 11/2007 | Nishino et al. | 349/38 |
| 7,330,231 | B2 | * | 2/2008 | Kim et al. | 349/114 |
| 7,567,312 | B2 | * | 7/2009 | Lin et al. | 349/48 |
| 7,642,554 | B2 | * | 1/2010 | Lee et al. | 257/59 |
| 2002/0118322 | A1 | | 8/2002 | Murade | |
| 2005/0270452 | A1 | * | 12/2005 | Ahn et al. | 349/114 |
| 2007/0188683 | A1 | * | 8/2007 | Naka | 349/114 |

FOREIGN PATENT DOCUMENTS

TW 200728814 8/2007

* cited by examiner

*Primary Examiner*—Uyen-Chau N Le
*Assistant Examiner*—John M Bedtelyon
(74) *Attorney, Agent, or Firm*—Winston Hsu

(57) ABSTRACT

The transflective LCD panel has many scan lines, data lines, and common electrodes, in which each data line includes a first data line section and a second data line section, and each common electrode has at least one first common electrode section. The scan lines and the second data line sections are made of a first conductive layer; and the first data line sections and the common electrodes are made of a second conductive layer. The first common electrode sections and the corresponding pixel electrodes are overlapped, thus providing the storage capacitance.

20 Claims, 18 Drawing Sheets

TRANSFLECTIVE LIQUID CRYSTAL DISPLAY PANEL AND PIXEL STRUCTURE THEREOF

BACKGROUND OF THE INVENTION

1. Field of the Invention

The present invention relates to a transflective liquid crystal display (LCD) panel and a pixel structure thereof, and more particularly, to a transflective LCD panel and a pixel structure thereof having higher aperture ratio.

2. Description of the Prior Art

In manufacturing the LCD, the value of the aperture ratio of the pixel structure directly affects the utilization of the backlight source and the display brightness of the panel. The major factor influencing the aperture ratio of the pixel structure is the distance between a pixel electrode (or transparent conductive electrode) and a data line. If a larger aperture ratio is required, the distance between the pixel electrode and the data line should be shortened. However, when the pixel electrode is too close to the data line, the capacitance between the pixel and data line (Cpd) shall be increased, thereby due to having a different voltage transferred from the data line before the switching to the next frame and thus leading to having the saturated charge on the pixel electrode and resulting in cross talk.

In order to reduce the influence of the Cpd, several methods have been researched. For example, a method is to increase the value of the storage capacitance that can reduce the ratio of the Cpd occupying with respect to all of the capacitors having influence on a sub-pixel unit; in addition, one method is to reduce a parasitic capacitance between the data line and the pixel electrode when there is a stable electrical field shielding between the pixel electrode and the data line; furthermore, a method provided by Optical Imaging Systems (OIS) is to coat an organic insulator film (K=2.7~3.5) through the use of the photo-imaged and spin on glass (SOG) methods, so that the capacitance between the data line and the pixel electrode can be reduced, so as to allow the pixel electrode to overlap the data line.

However, the above-mentioned methods will result in several negative effects upon the display effect or the fabrication process, so that a further improvement is required. For example, the method of increasing the size and area of the storage capacitor for increasing capacitance shall affect the aperture ratio of the pixel structure. The organic insulator film itself has the issues of water absorption, yellowing, and poor interface adhesion so as to affect the yield and the throughput.

In addition, with regards to the transflective LCD, the standards of some products require a lower reflectivity, such as the reflectivity lower than 3%, which is having the ratio of the size of the reflective region to the total size of the displaying region being lower than 3%. In this situation, it is extremely difficult to design the thin film transistor device and the storage capacitor both inside the reflective region together and to have the thin film transistor device and the storage capacitor being totally shielded by the reflective electrode. The thin film transistor device is an essential device, and thus it cannot be eliminated. If the aperture ratio of the transmissive region is to be totally unaffected, the size of the storage capacitor is required to be reduced. When the storage capacitance becomes too low, an electric leakage issue is easily appeared, and the slightly bright spots or slightly dark spots are generated so as to decrease the quality of the LCD. Therefore, without changing the aperture ratio, the ability to increase the storage capacitance of the transflective LCD is an important subject in the development of the transflective LCD.

SUMMARY OF THE INVENTION

It is therefore a primary object of the present invention to provide a transflective liquid crystal display panel and a pixel structure thereof so as to increase storage capacitance and the aperture ratio.

According to an aspect of the claimed invention, a pixel structure of a transflective liquid crystal display panel is provided. The pixel structure comprises the following: a substrate having a pixel region; and the pixel region comprises a reflective region and a transmissive region; a data line disposed on the substrate along a first direction, and the data line comprises a first data line section and a second data line section; a common electrode, disposed on the substrate, comprises at least one first common electrode section disposed in the transmissive region along the first direction; a scan line disposed on the substrate along a second direction; a transmissive electrode disposed in the transmissive region; a reflective electrode, disposed in the reflective region, is also electrically connected to the transmissive electrode; and a thin film transistor electrically connected to the scan line and the data line. The first data line section and the second data line section are electrically connected to each other by a contact via. The first common electrode section and the corresponding second data line section are substantially overlapped. The scan line and the second data line section are made of a first conductive layer; and the first data line section and the common electrode are made of a second conductive layer. The transmissive electrode and the common electrode are electrically disconnected to each other, and are at least partially overlapped.

Therefore according to the present invention, the scan line and the second data line section of the transflective LCD are made of the first conductive layer, and the first data line section and the common electrode are made of the second conductive layer. The common electrode and the transmissive electrode overlap each other, thereby a storage capacitor is provided. According to the above-mentioned design, the reflective region of the transflective LCD of the present invention only requires of having the thin film transistor being disposed therein, and does not require of having a space being arranged to contain the storage capacitor. Therefore, the size of the reflective region can be effectively reduced, and the aperture ratio in transmissive region is raised.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
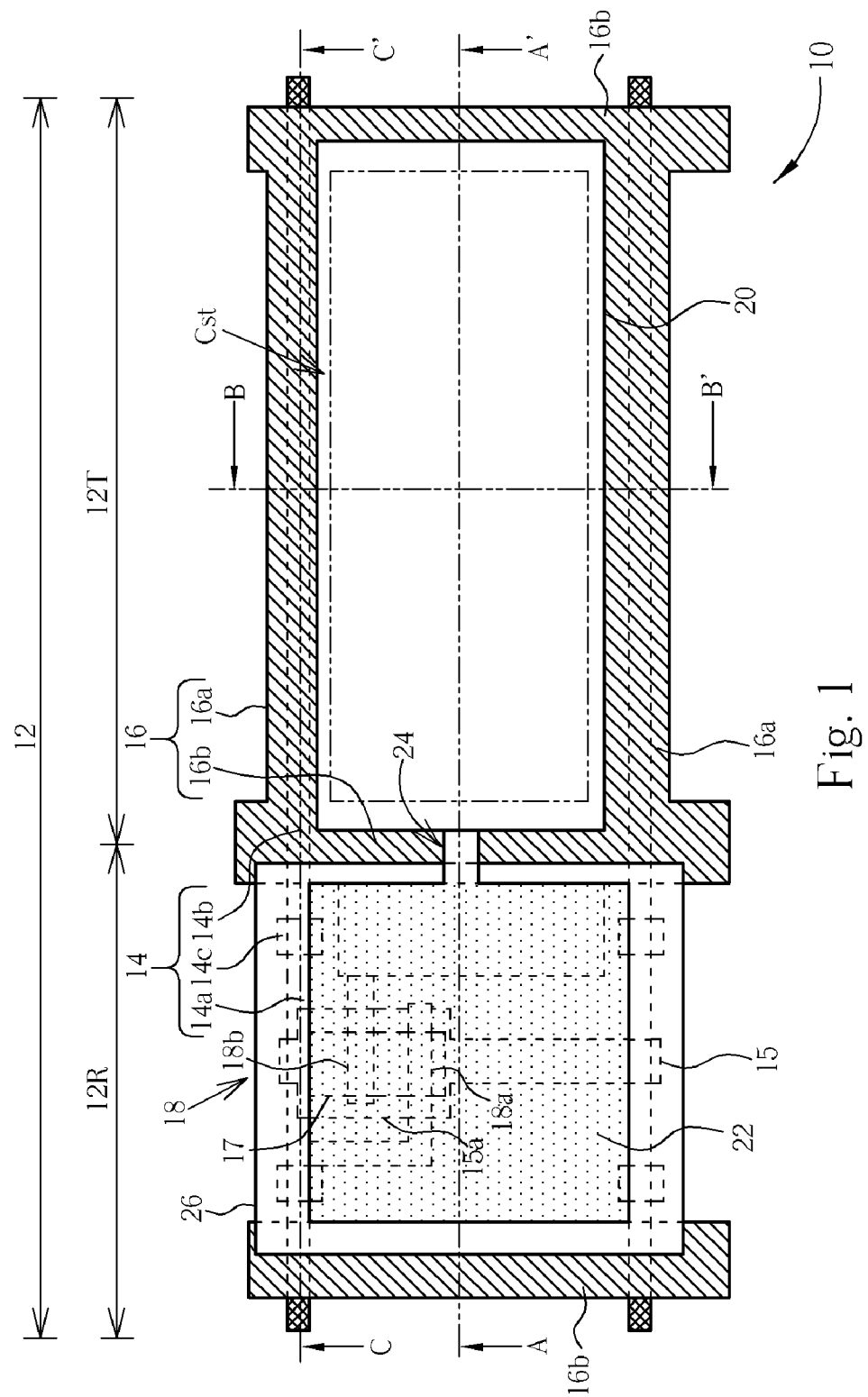
FIG. 1 through FIG. 5 are schematic diagrams illustrating a multi-domain vertical alignment (MVA) transflective LCD panel and a pixel structure thereof according to a first embodiment of the present invention.
Figure 2:
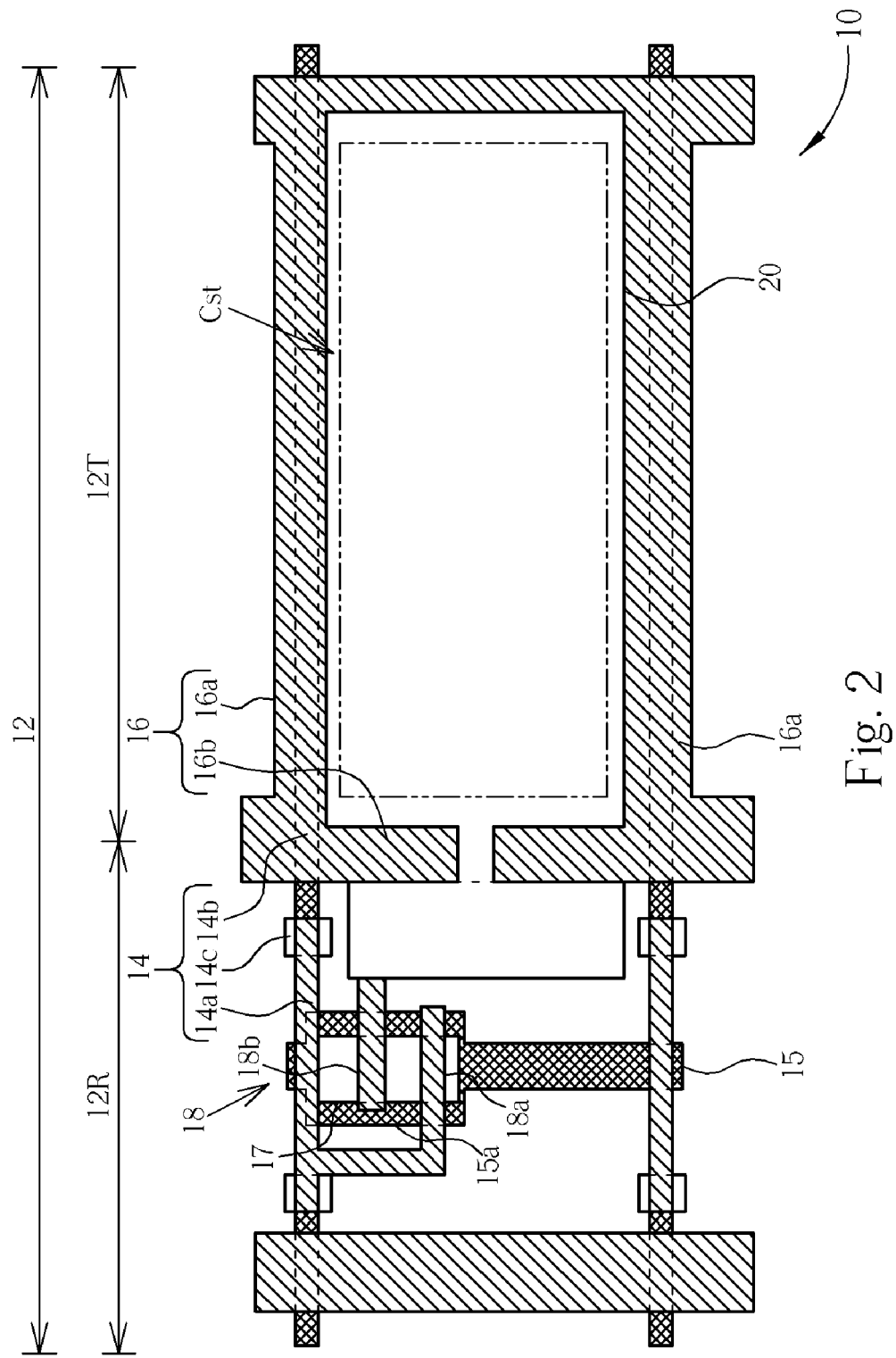
Figure 3:
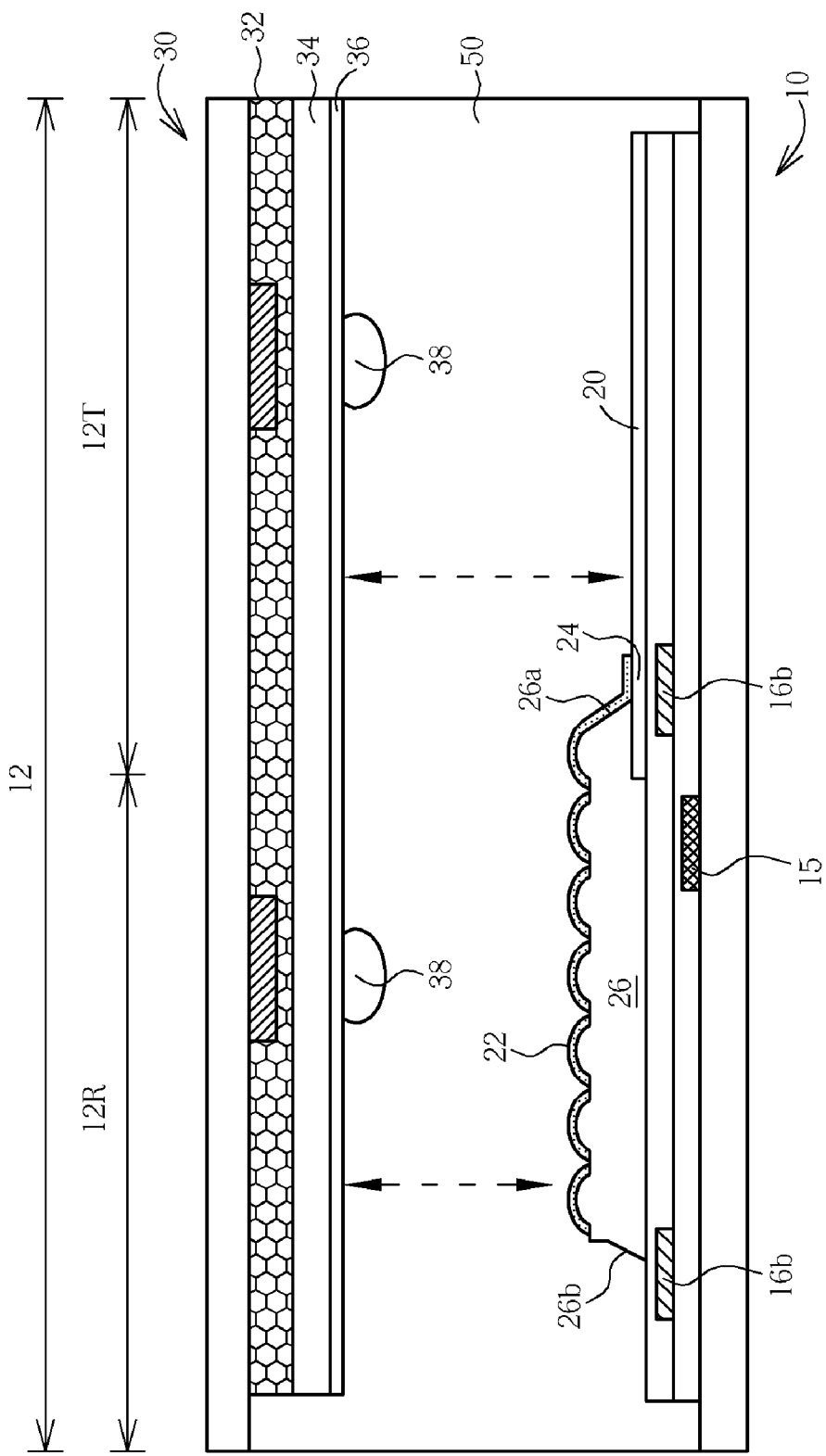
Figure 4:
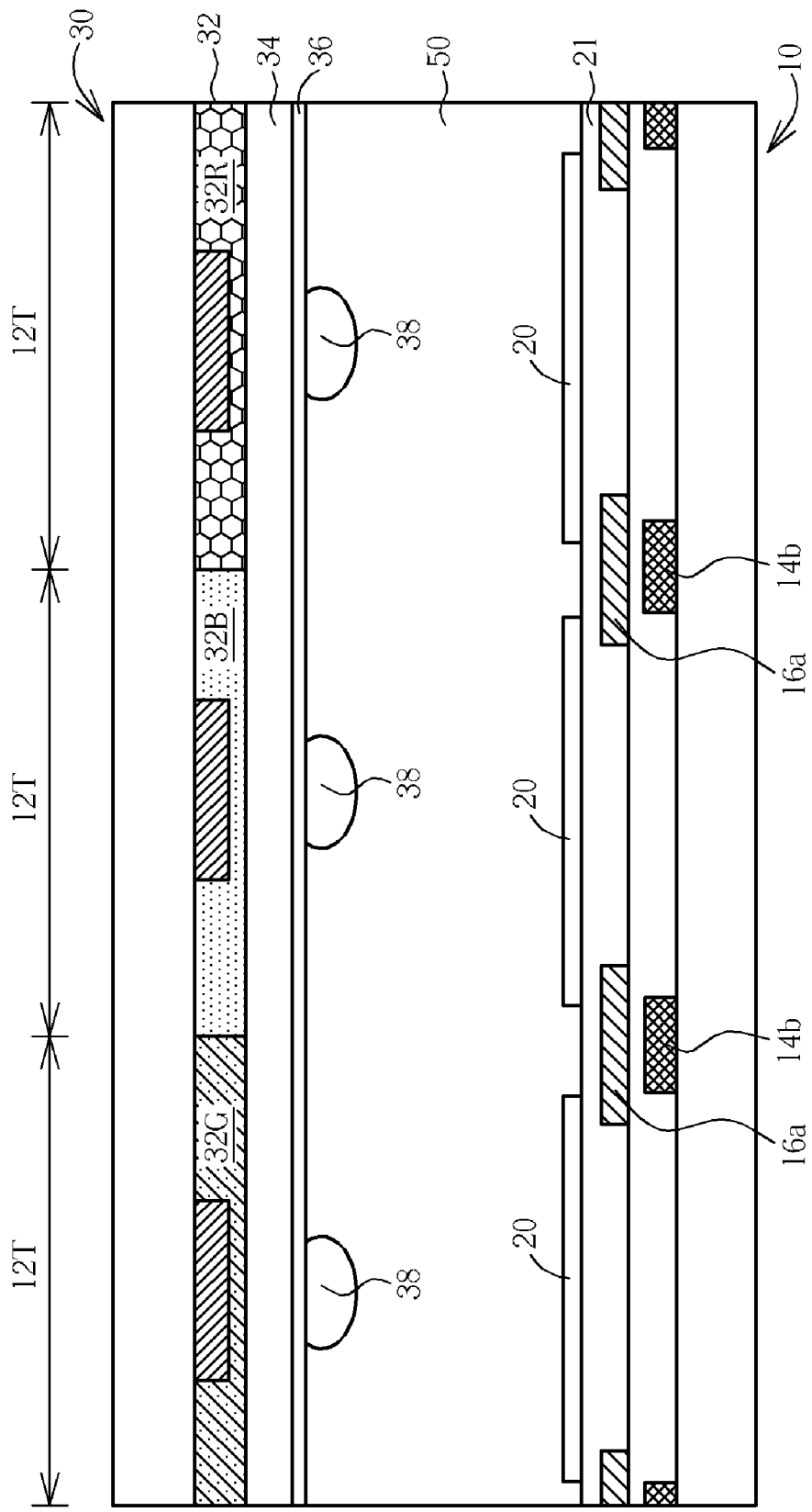
Figure 5:
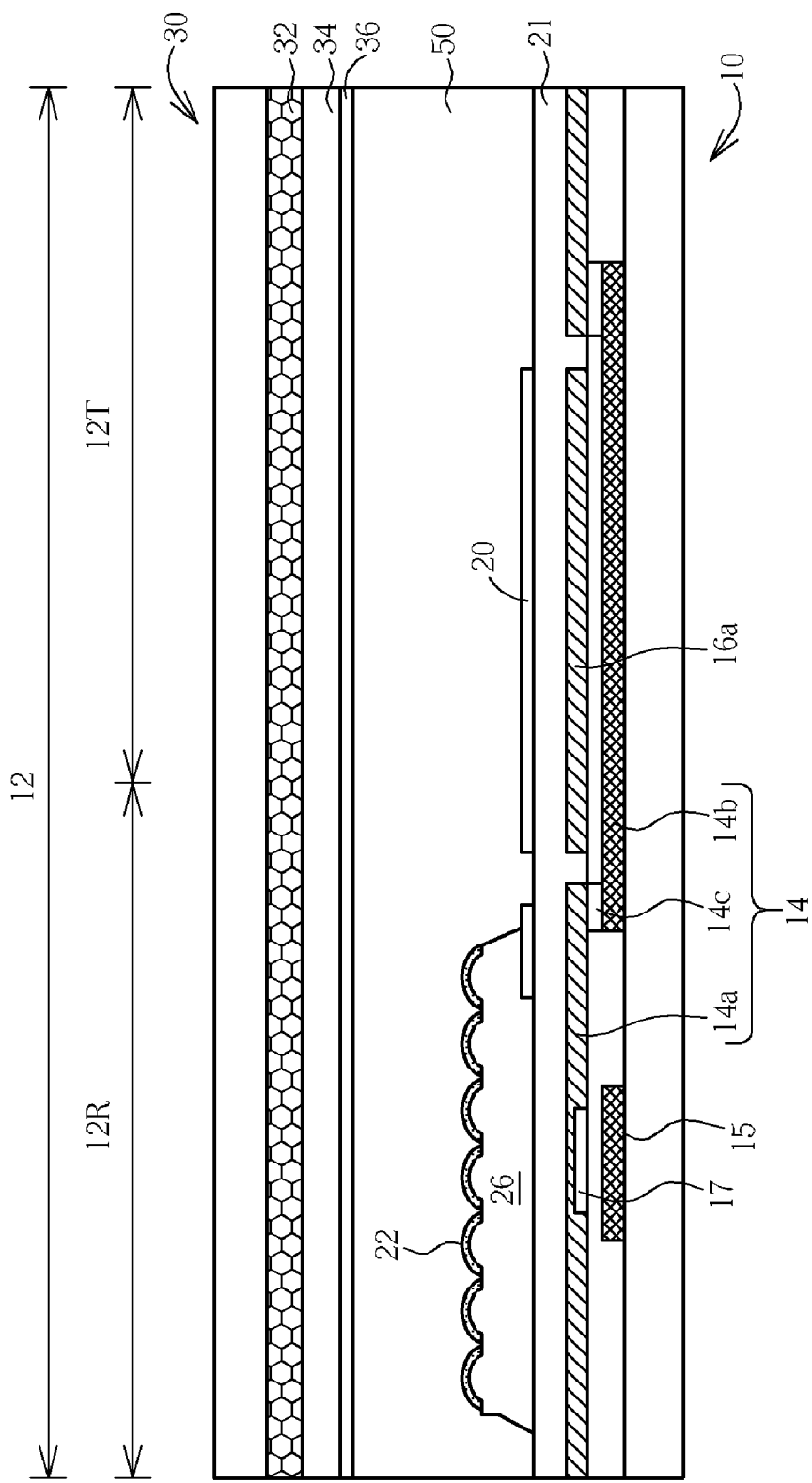

Refer to FIG. 1 through FIG. 5. FIG. 1 through FIG. 5 are schematic diagrams illustrating a multi-domain vertical alignment (MVA) transflective LCD panel and a pixel structure thereof according to a first embodiment of the present invention. This embodiment takes a dual cell gap transflective LCD panel as an example to exemplify the features of the present invention. FIG. 1 is a top view illustrating an array substrate of the transflective LCD panel. FIG. 2 is a top view illustrating a part of the array substrate shown in FIG. 1. FIG. 3 is a cross section illustrating the transflective LCD panel along line AA' shown in FIG. 1. FIG. 4 is a cross section illustrating the transflective LCD panel along line BB' shown in FIG. 1, and the transmissive region 12T of the extending adjacent pixels. FIG. 5 is a cross section illustrating the transflective LCD panel along line CC' in FIG. 1. As shown in FIG. 1 through FIG. 5, the transflective LCD panel comprises a first substrate 10 (array substrate), a second substrate 30 (color filter substrate, which is not shown in FIG. 1 and FIG. 2) disposed opposite to the first substrate 10, and a liquid crystal layer 50 (not shown in FIG. 1 and FIG. 2) disposed between the first substrate 10 and the second substrate 30. The first substrate 10 has a plurality of pixel regions 12, and each pixel region 12 comprises a reflective region 12R and a transmissive region 12T. In addition, the first substrate 10 has a plurality of data lines 14 disposed along a first direction (transverse direction in FIG. 1) and a plurality of scan lines 15 disposed along a second direction (longitudinal direction in FIG. 1). The first direction is substantially perpendicular to the second direction. Each data line 14 comprises a first data line section 14a and a second data line section 14b, and the first data line section 14a and the second data line section 14b may be made of different conductive layers, for example. More exactly stated, the first data line section 14a of this embodiment is made of a second conductive layer. Take the process of the thin film transistor (gated type) as an example, the second conductive layer and the source/drain of the thin film transistor device are in the same metal layer. The second data line section 14b is made of the first conductive layer. Take the process of the thin film insulated gate transistor as an example, the first conductive layer, the scan line 15, and the gate of the thin film transistor device are in the same metal layer. The first data line section 14a and the second data section 14b of each data line 14 are partially overlapped (as shown in FIG. 5); and the first data line section 14a and the second data line section 14b are electrically connected to each other through a contact via 14c disposed between the first data line section 14a and the second data line section 14b. In other words, the insulating layer (not numbered in figure) disposed between the first data line section 14a and the second data line section 14b has the contact via 14c adapted to expose the second data line section 14b, and the contact via 14c is filled up with a part of the first data line section 14a, and the part of the first data line section 14a is adapted to electrically connect to the second data line section 14b.

In addition, the transflective LCD panel also comprises a plurality of common electrodes 16 disposed on the first substrate 10. Each common electrode 16 comprises at least one first common electrode section 16a disposed in each transmissive region 12T along the first direction. The first common electrode section 16a is made of the second metal layer, and the first common electrode section 16a substantially overlaps the second data line section 14b. Furthermore in this embodiment, each common electrode 16 may further comprise at least one second common electrode section 16b disposed in the transmissive region 12T along the second direction. The second common electrode section 16b and the first common electrode 16a, for example, are of the same metal layer, and which is the second metal layer. Besides, in this embodiment, the second common electrode section 16b is disposed in an adjoining region between the reflective region 12R and the transmissive region 12T. The first common electrode section 16a and the second common electrode section 16b of each common electrode 16 are electrically connected to each other, and substantially surround the corresponding transmissive region 12T.

The transflective LCD panel further comprises a plurality of thin film transistors 18. Each thin film transistor 18 is respectively disposed in the reflective region 12R in the corresponding pixel region 12, and each thin film transistor 18 comprises a gate 15a electrically connected to the corresponding scan line 15, a source 18a electrically connected to the corresponding data line 14, a drain 18b, and a semiconductor layer 17 (amorphous silicon layer or polysilicon layer, for example). In addition, the transflective LCD panel also has a plurality of transmissive electrodes 20 respectively disposed in the transmissive region 12T of each pixel region 12 and electrically connected to the drain 18b of the thin film transistor 18, and a plurality of reflective electrodes 22 respectively disposed in the reflective region 12R of each pixel region 12. The transmissive electrode 20 is made of a transparent conductive material, such as indium-tin oxide (ITO) or indium-zinc oxide (IZO), and the reflective electrode 22 is made of a material with higher reflectivity, such as aluminum, silver, etc. Besides, in a same pixel region 12, a dielectric layer 21 is disposed between the transmissive electrode 20 and the common electrode 16 so that the transmissive electrode 20 and the common electrode 16 are electrically disconnected to each other, and are at least overlapped; and the transmissive electrode 20, the dielectric layer 21, and the common electrode 16 form a storage capacitor (Cst). In the same pixel region 12, the reflective electrode 22 is electrically connected to the transmissive electrode 20 through a connecting electrode 24. And for example, the connecting electrode 24 is an extension of the transmissive electrode 20 in this embodiment. The first substrate 10 further comprises an adjusting layer 26 disposed under the reflective electrode 22 in each reflective region 12R, and the reflective electrode 22 substantially covers the adjusting layer 26. The purpose of disposing the adjusting layer 26 is to raise the reflective electrode 22 up, so that the outside light in the reflective region 12R and the backlight in the transmissive region 12T passing through the liquid crystal layer 50 have the same optical path difference during the displaying by the transflective LCD panel. Furthermore, a lithography process is utilized to form a rough and uneven surface on the adjusting layer 26, so that the reflective electrode 22 disposed on the adjusting layer 26 is also to have a rough and uneven surface because of the rough and uneven surface of the adjusting layer 26. The rough and uneven surface of the reflective electrode 22 can scatter the outside light entering the reflective region 12R. In addition, two sidewalls of the adjusting layer 26 have a tilted surface 26a and a tilted surface 26b, respectively; and the tilted surfaces 26a, 26b are to affect the arrangement of the liquid crystal molecules of the liquid crystal layer 50 thereon, so as to easily create the issue of light leakage at this location. In the design of the transflective LCD panel of this embodiment, the reflective electrode 22 is formed only on the rough and uneven surface of the adjusting layer 26. Furthermore, in order to electrically connect the reflective electrode 22 and the transmissive electrode 20, the reflective electrode 22 only covers a portion of the tilted surface 26a of the adjusting layer 26 near the transmissive region 12T, so as to be electrically connected to the transmissive electrode 20. The reflective electrode 22 of this embodiment exposes the tilted surface 26b and a substantial portion of the tilted surface 26a. Regarding the issue of the light leakage, the second common electrode section 16b is disposed to the position substantially corresponding to the tilted surface 26a, 26b of the adjusting layer 26. In other words, the second common electrode section 16b and the tilted surface 26a at least partially overlap each other, so that the common electrode section 16b can provide the effect of shielding the leakage light.

On the other hand, the second substrate 30 comprises a plurality of color filters 32 which are corresponding to each pixel region 12, respectively, such as red color filter 32R, green color filter 32G and blue color filter 32B, an overcoat layer 34 covering the surface of the color filter 32, a common electrode layer 36 disposed on the surface of the overcoat layer 34, and a plurality of protrusions 38 disposed on the surface of the common electrode 36. The protrusions 38 can change the distribution of the electric field to make the liquid crystal incline towards the protrusions 38. Therefore, the function of multi-domain alignment can be achieved, and the issue of grayscale invert can be solved, so that the displaying function having the wider viewing angle is achieved.

As the above-mentioned, this embodiment utilizes the overlap of the common electrode 16 and the transmissive electrode 20 to form the storage capacitor. For this reason, the occupying space of the reflective region 12R only requires to contain the thin film transistor 18, and does not require to dispose the storage capacitor therein. Therefore, the size proportion of the reflective region 12R can be effectively reduced to raise the aperture ratio of the transmissive region 12T. It should be noted that the scan line 15 and the second data line section 14b of the present invention are made of the same first conductive layer, so that they can be finished in the same deposition and etching process. In addition, the first data line section 14a and the common electrode 16 are made of the same second conductive layer, so that they also can be finished in the same deposition and etching process. Furthermore, the reflective electrode 22 is disposed over the adjusting layer 26, so that the reflective electrode 22 can directly be electrically connected to the transmissive electrode 20, and does not require to use the contact via to connect. Therefore, the transflective LCD panel of the present invention does not require increased manufacturing cost.

In order to compare the difference between each embodiment of the present invention and exemplify the features of each embodiment, like elements are denoted by like numerals, and are not detailed redundantly. The following description will only mention the difference between each embodiment.

Figure 6:
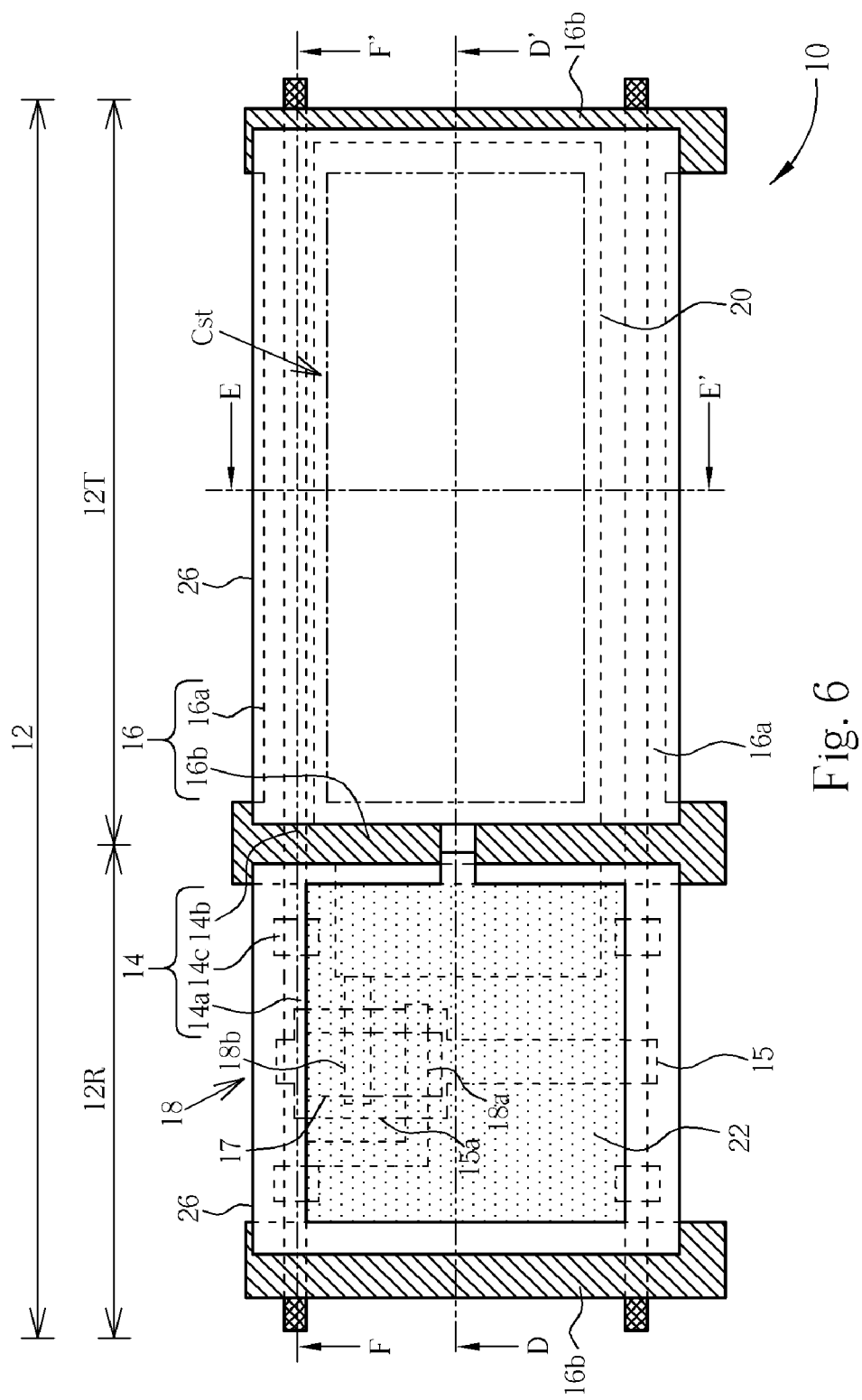
FIG. 6 through FIG. 9 are schematic diagrams illustrating a transflective LCD panel and a pixel structure thereof according to a second embodiment of the present invention.
Figure 7:
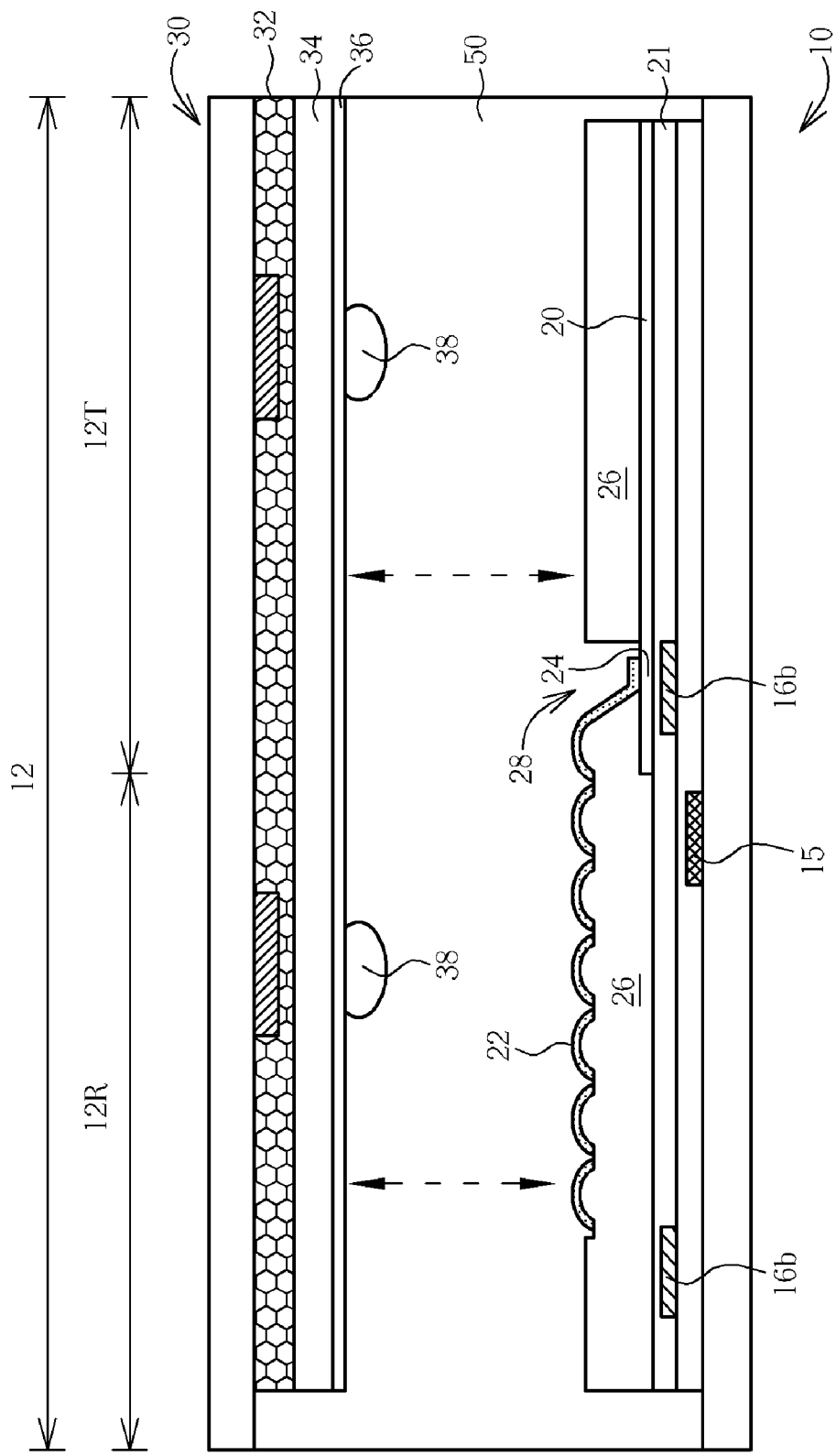
Figure 8:
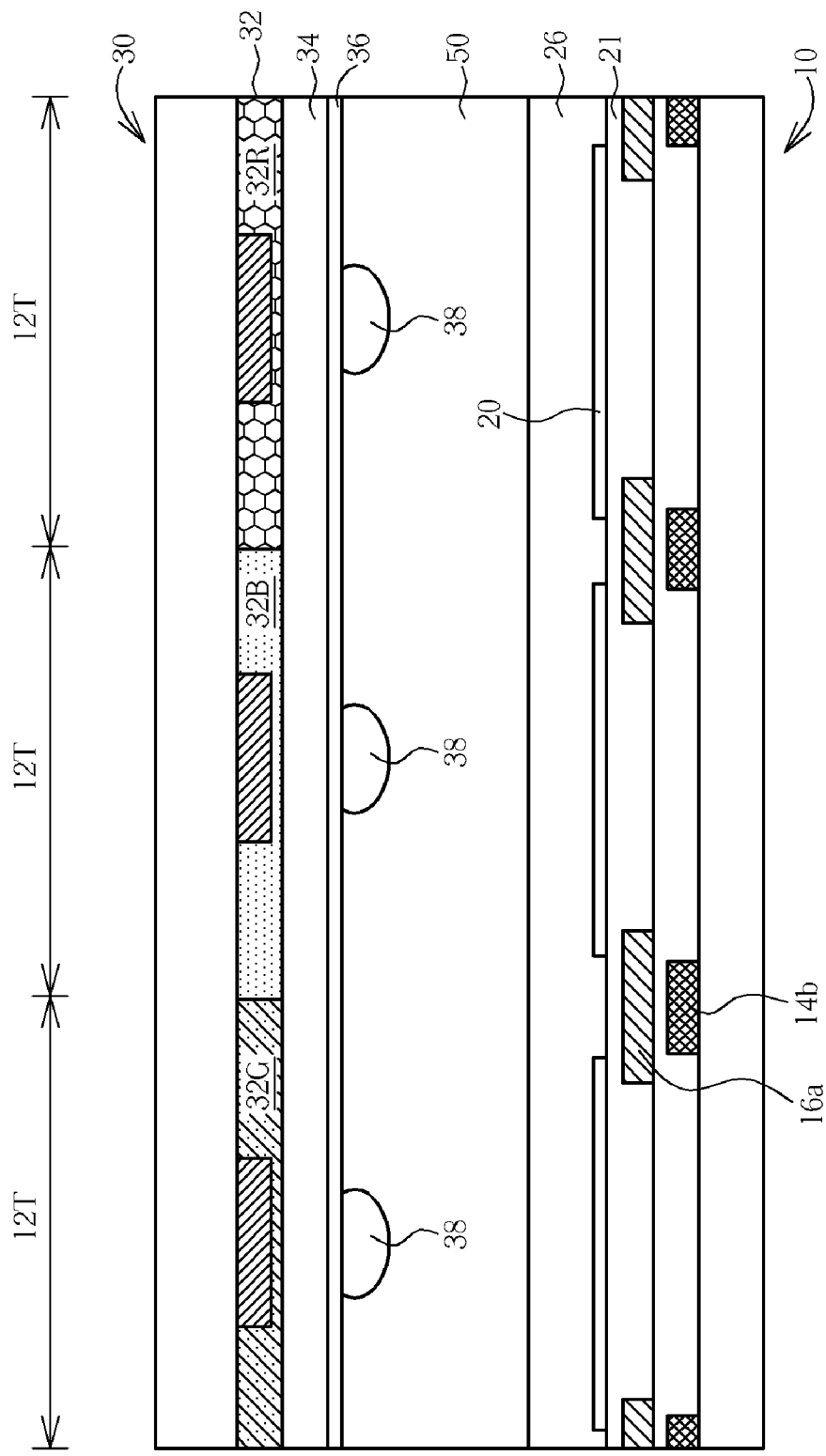
Figure 9:
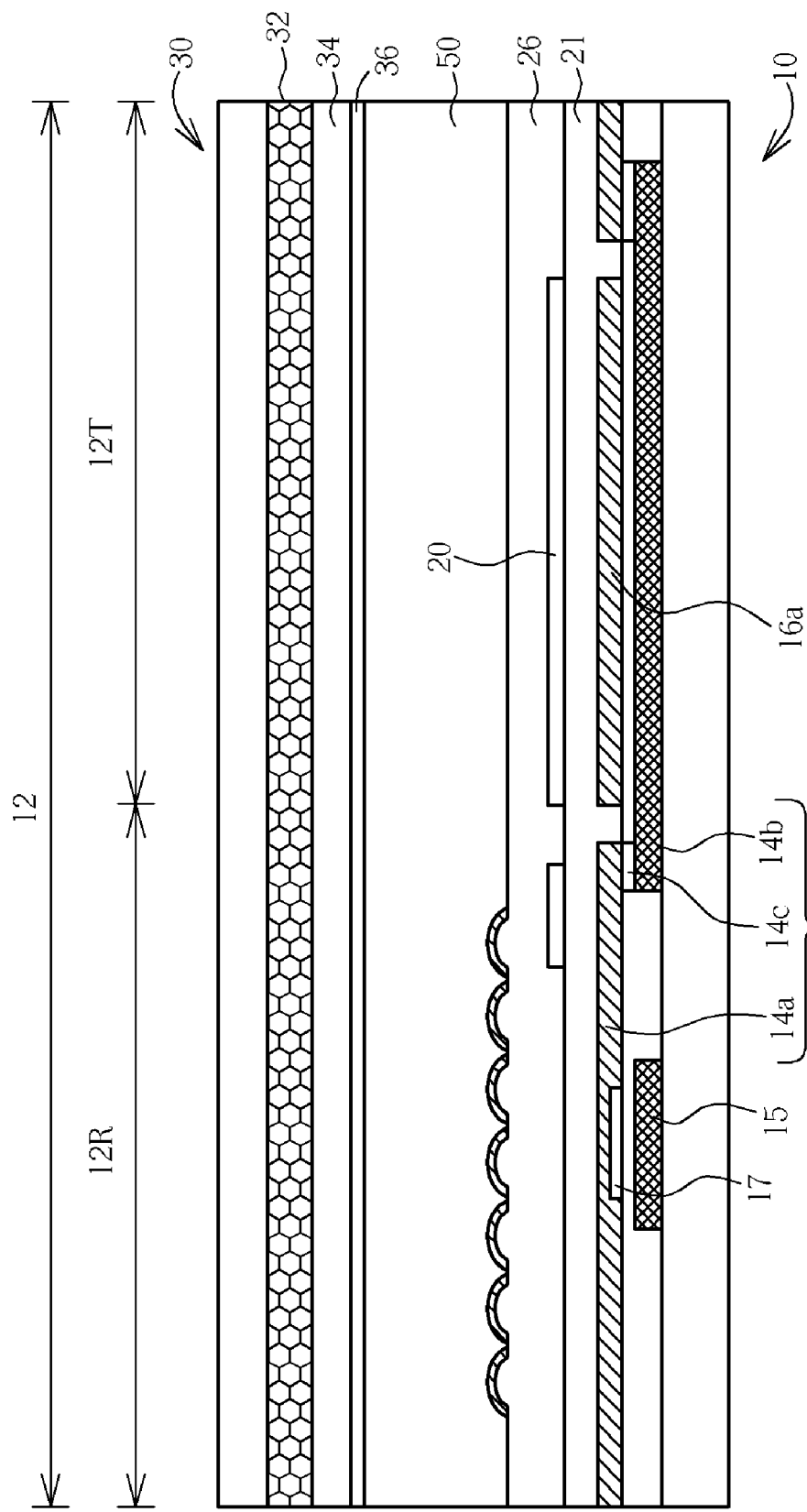

Refer to FIG. 6 through FIG. 9. FIG. 6 through FIG. 9 are schematic diagrams illustrating a transflective LCD panel and a pixel structure thereof according to a second embodiment of the present invention. This embodiment takes a single cell gap transflective MVA LCD panel as an example to exemplify the features of the present invention. FIG. 6 is a top view illustrating an array substrate of the transflective LCD panel. FIG. 7 is a cross section illustrating the transflective LCD panel along line DD' shown in FIG. 6. FIG. 8 is a cross section illustrating the transflective LCD panel along line EE' shown in FIG. 6, and the transmissive region 12T of the extending adjacent pixels. FIG. 9 is a cross section illustrating the transflective LCD panel along line FF' shown in FIG. 6. As shown in FIG. 6 through FIG. 9, the transflective LCD panel of this embodiment is a single cell gap transflective LCD panel; therefore, the transmissive region 12T also has the adjusting layer 26 disposed therein. For this reason, the reflective region 12R and transmissive region 12T have the same cell gap, but the transmissive electrode 20 can be formed before the adjusting layer 26. Therefore, the transmissive electrode 20 is disposed under the adjusting layer 26, and the adjusting layer 26 in the adjoining region between the transmissive region 12T and the reflective region 12R has a gap 28 to expose the transmissive electrode 20, so that the reflective electrode 22 formed in the subsequent procedures can be directly electrically connected to the transmissive electrode 20 through the gap 28.

Figure 10:
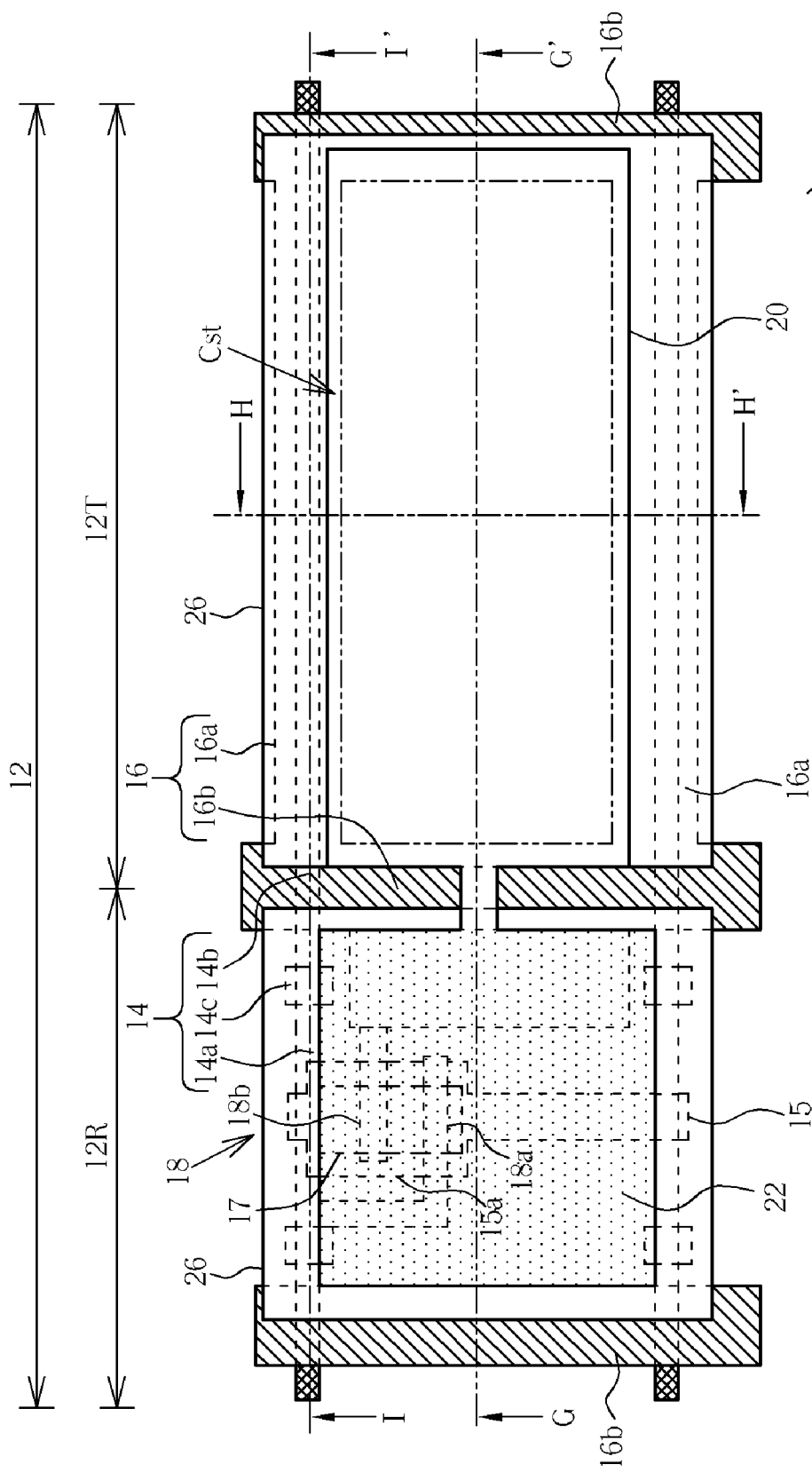
FIG. 10 through FIG. 13 are schematic diagrams illustrating a transflective LCD panel and a pixel structure thereof according to a third embodiment of the present invention.
Figure 11:
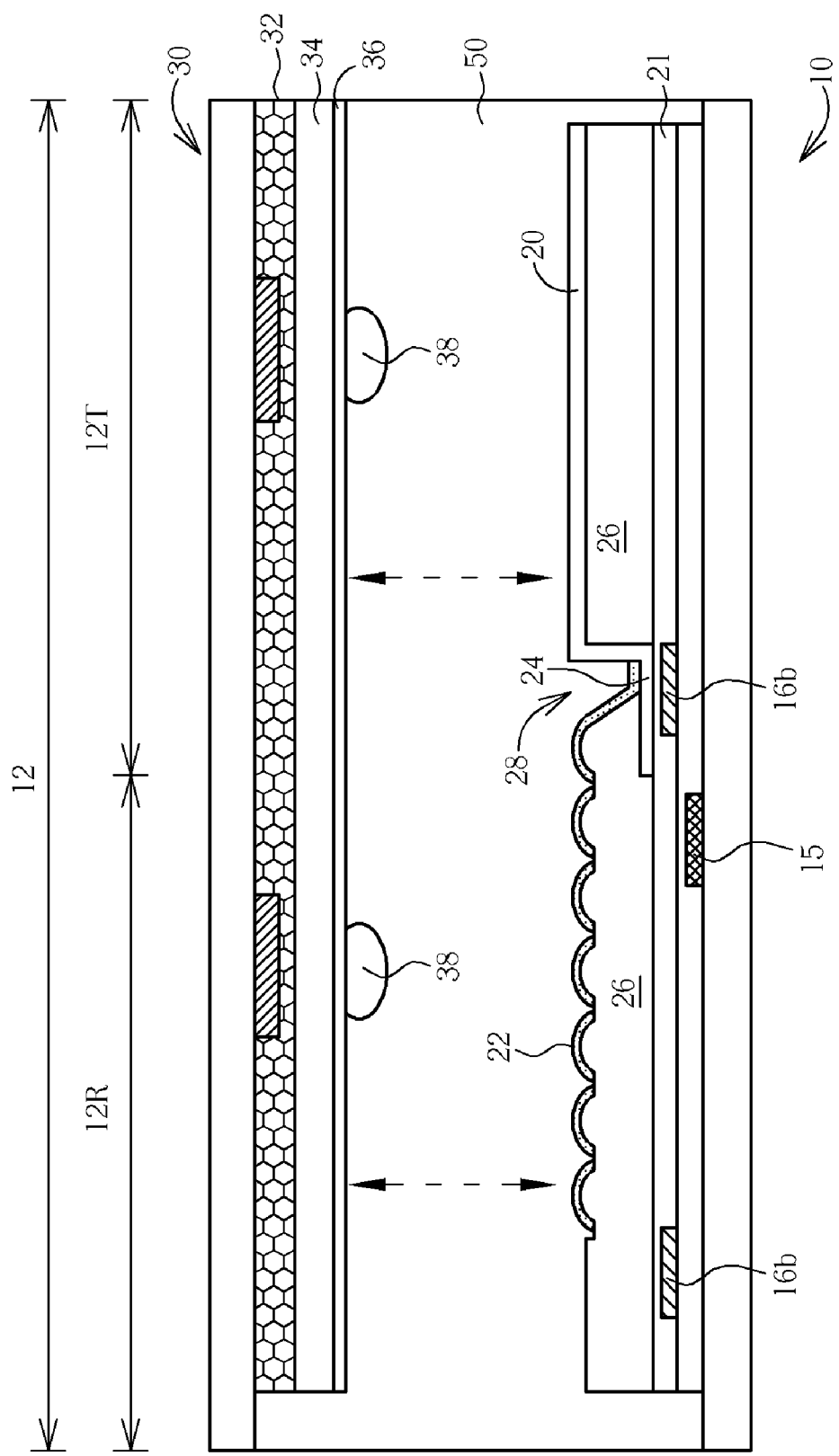
Figure 12:
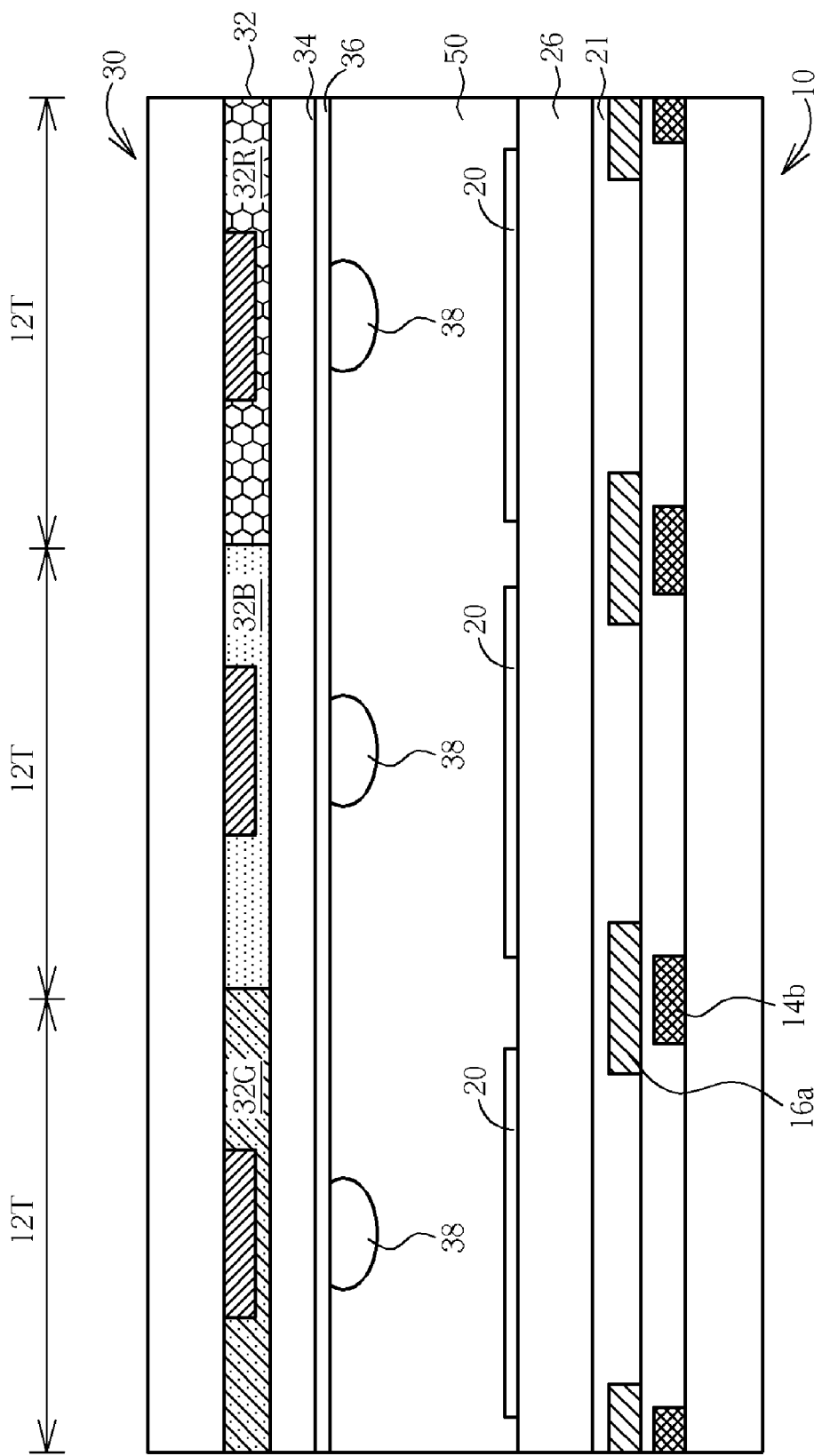
Figure 13:
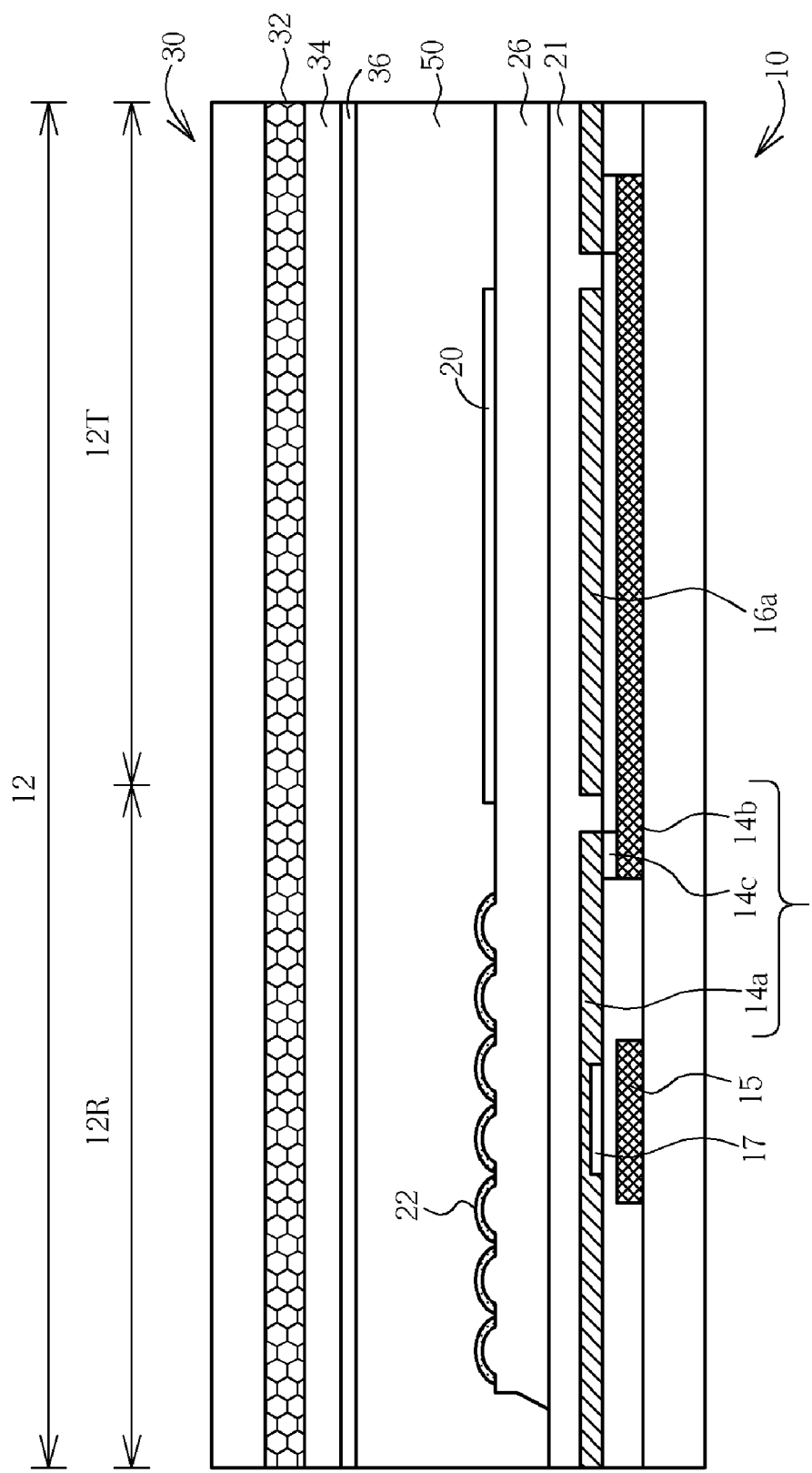

Refer to FIG. 10 through FIG. 13. FIG. 10 through FIG. 13 are schematic diagrams illustrating a transflective LCD panel and a pixel structure thereof according to a third embodiment of the present invention. This embodiment also takes a single cell gap transflective LCD panel as an example to exemplify the features of the present invention. FIG. 10 is a top view illustrating an array substrate of the transflective LCD panel. FIG. 11 is a cross section illustrating the transflective LCD panel along line GG' shown in FIG. 10. FIG. 12 is a cross section illustrating the transflective LCD panel along line HH' in FIG. 10. FIG. 13 is a cross section illustrating the transflective LCD panel along line 11' shown in FIG. 10. As shown in FIG. 10 through FIG. 13, because the transflective LCD panel of this embodiment is a single cell gap transflective LCD panel, the transmissive region 12T also has the adjusting layer 26 disposed therein, so that both the reflective region 12R and transmissive region 12T have the same cell gap. The transmissive electrode 20 is disposed on the surface of the adjusting layer 26. Because the transmissive electrode 20 may not require a rough and uneven surface, the adjusting layer 26 in the transmissive region 12T does not have the rough and uneven surface. In addition, the adjusting layer 26 in the adjoining region between the transmissive region 12T and the reflective region 12R has a gap 28. The transmissive electrode 20 and the reflective electrode 22 in the gap 28 are electrically connected, and are electrically connected to the thin film transistor.

Figure 14:
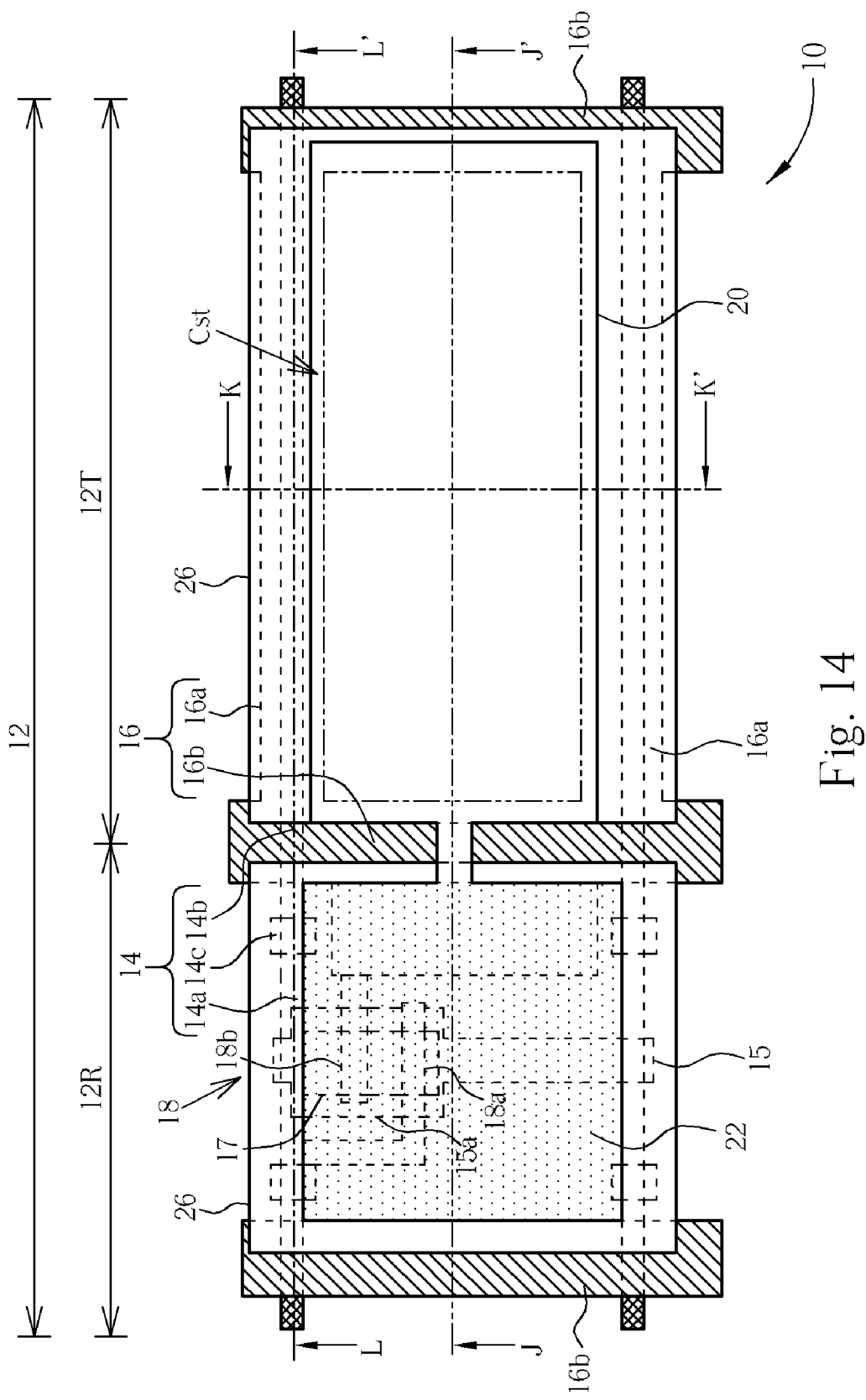
FIG. 14 through FIG. 17 are schematic diagrams illustrating a transflective LCD panel and a pixel structure thereof according to a fourth embodiment of the present invention.
Figure 15:
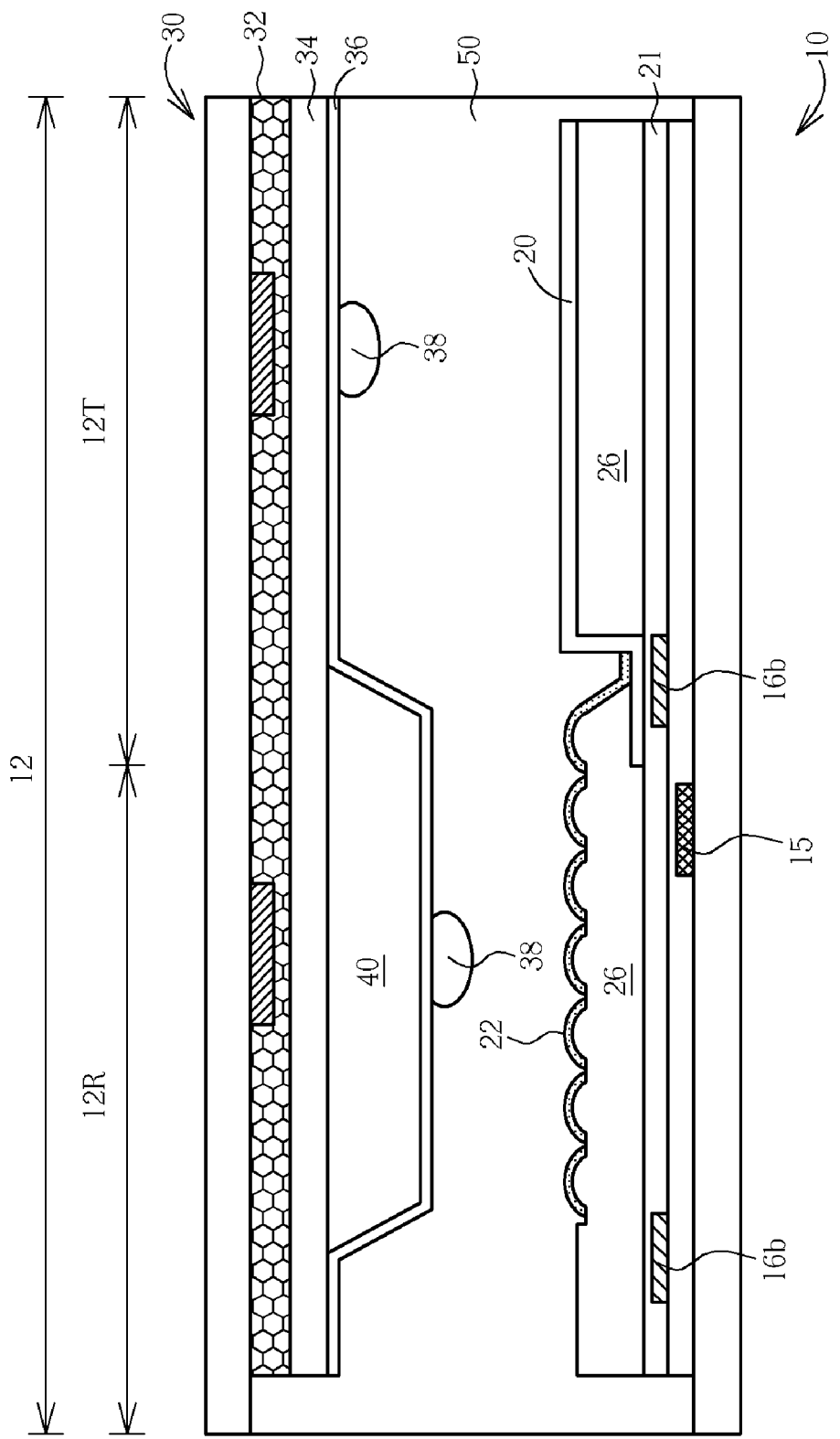
Figure 16:
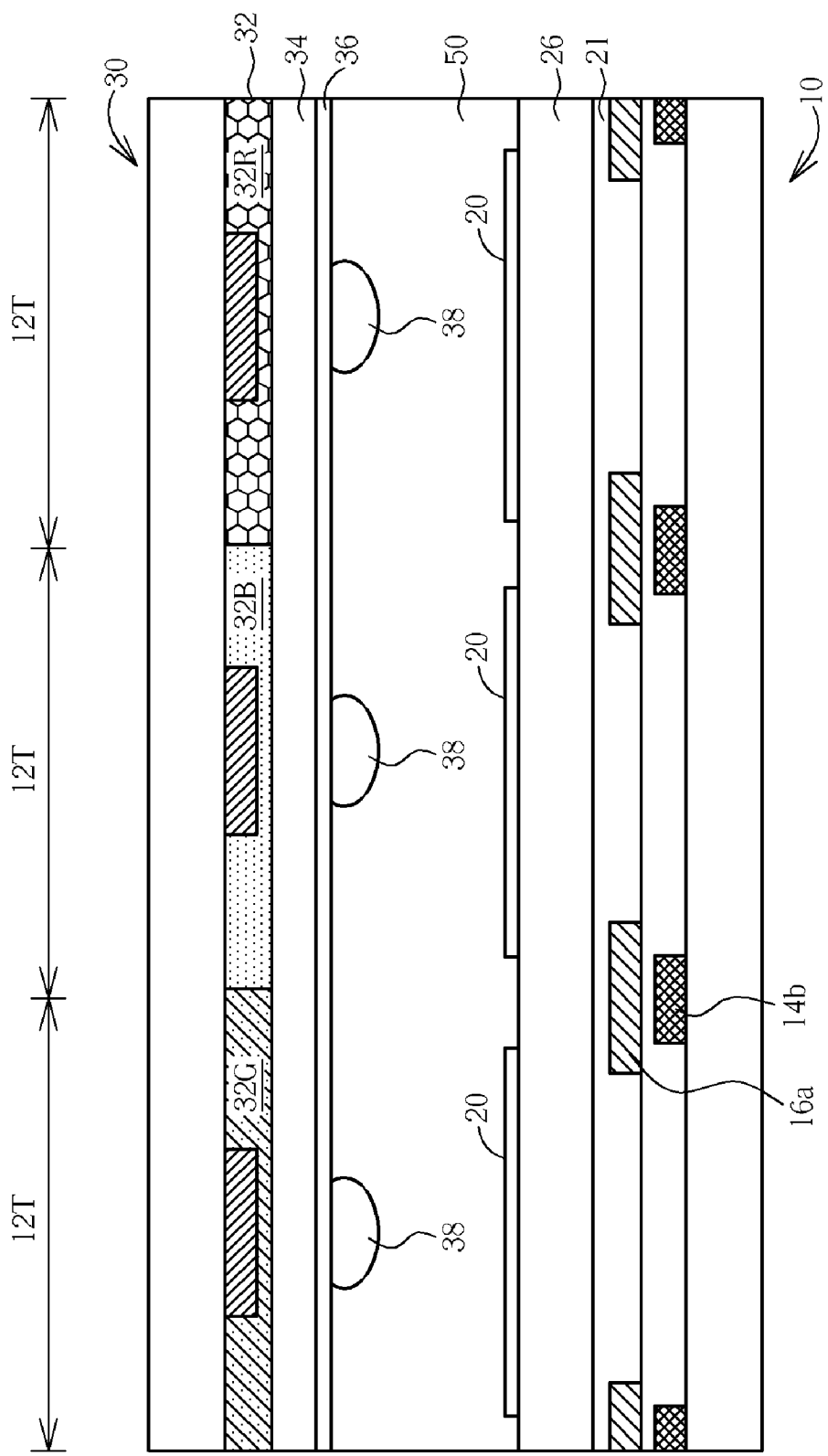
Figure 17:
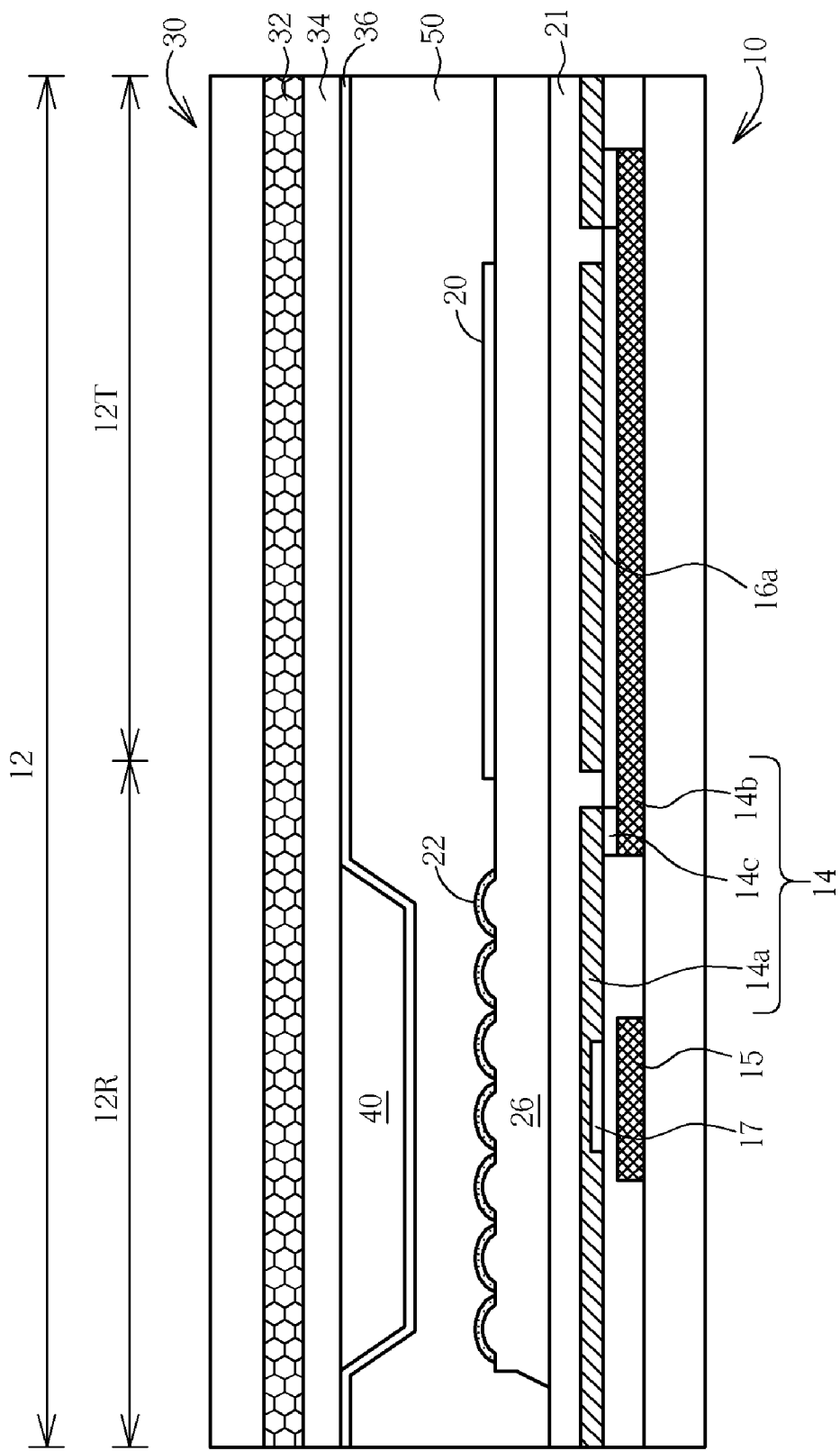

Refer to FIG. 14 through FIG. 17. FIG. 14 through FIG. 17 are schematic diagrams illustrating a transflective LCD panel and a pixel structure thereof according to a fourth embodiment of the present invention. FIG. 14 is a top view illustrating an array substrate of the transflective LCD panel. FIG. 15 is a cross section illustrating the transflective LCD panel along line JJ' shown in FIG. 14. FIG. 16 is a cross section illustrating the transflective LCD panel along line KK' shown in FIG. 10. FIG. 17 is a cross section illustrating the transflective LCD panel along line LL' shown in FIG. 14. As shown in FIG. 14 through FIG. 17, the structure of the first substrate 10 of the transflective LCD panel of this embodiment is similar to that of the substrate 10 of the third embodiment. The transflective LCD panel of this embodiment in the position of the second substrate 30 corresponding to each reflective region 12R further respectively comprises an adjusting bump or layer 40, so that the reflective region 12R and the transmissive region 12T are to have different cell gaps.

Figure 18:
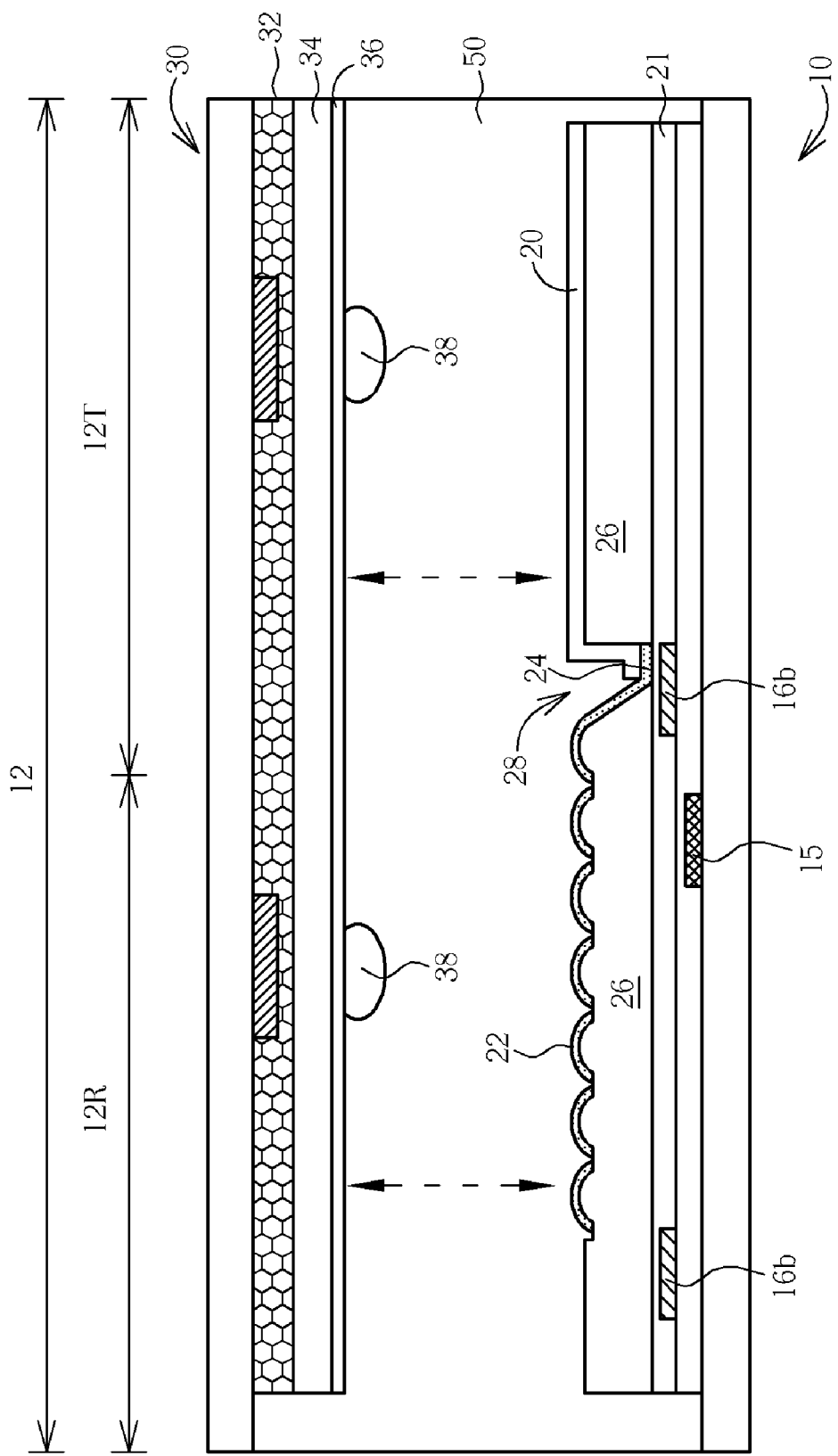
FIG. 18 is a schematic diagram illustrating a transflective LCD panel according to another embodiment of the present invention.

In each of the above-mentioned embodiments, the reflective electrode 22 is disposed on the transmissive electrode 20, and the connecting electrode 24 is an extension of the transmissive electrode 20. But the present invention is not limited to this. Refer to FIG. 18. FIG. 18 is a schematic diagram illustrating a transflective LCD panel according to another embodiment of the present invention. As shown in FIG. 18, the difference between this embodiment and each of the above-mentioned embodiments is that the connecting electrode 24 of this embodiment is an extension of the reflective electrode 22. The transmissive electrode 20 is disposed on the reflective electrode 22, so that the transmissive electrode 20 also can be electrically connected to the reflective electrode 22.

In conclusion, the data line of the transflective LCD panel according to each embodiment of the present invention comprises the first data line section made of the second metal layer, and the second data line section made of the first metal layer; and the second metal layer corresponding to the second data line section comprises the common electrode disposed therein. For this reason, the common electrode not only can have the effect of electrode shielding, but also can form the storage capacitor with the transmissive electrode overlapping therewith. According to the above-mentioned design, the reflective region of the transflective LCD panel of the present invention is only required to dispose the thin film transistor therein, but does not require to provide a space for containing the storage capacitor. Therefore, the size of the reflective region can be effectively reduced, so as to raise the aperture ratio of the transmissive region.

Those skilled in the art will readily observe that numerous modifications and alterations of the device and method may be made while retaining the teachings of the invention.

What is claimed is:

1. A pixel structure, comprising:
   a substrate having a pixel region, the pixel region including a reflective region and a transmissive region;
   a data line disposed on the substrate along a first direction, the data line including a first data line section and a second data line section, wherein the first data line section and the second data line section are electrically connected to each other through a contact via;
   a common electrode disposed on the substrate, the common electrode including at least one first common electrode section disposed on the transmissive region along the first direction; and the first common electrode section and the corresponding second data line section are substantially overlapped;
   a scan line disposed on the substrate along a second direction, wherein the scan line and the second data line section are made of a first conductive layer, and the first data line section and the common electrode are made of a second conductive layer;
   a transmissive electrode disposed in the transmissive region, wherein the transmissive electrode and the common electrode are electrically disconnected to each other, and are at least partially overlapped;
   a reflective electrode disposed in the reflective region and electrically connected to the transmissive electrode; and
   a thin film transistor electrically connected to the scan line and the data line.

2. The pixel structure of claim 1, wherein the common electrode further includes at least one second common electrode section disposed in the transmissive region along the second direction and electrically connected to the first common electrode section.

3. The pixel structure of claim 2, wherein the second common electrode section is disposed in an adjoining region between the reflective region and the transmissive region.

4. The pixel structure of claim 2, wherein the first common electrode section and the second common electrode section substantially surrounds the transmissive region.

5. The pixel structure of claim 1, further comprising an adjusting layer disposed in the reflective region, and the reflective electrode being disposed over the adjusting layer.

6. The pixel structure of claim 5, wherein the adjusting layer has a rough surface, and the reflective electrode thereby has a rough surface.

7. The pixel structure of claim 5, wherein the reflective electrode at least exposes a tilted surface of the adjusting layer.

8. The pixel structure of claim 5, wherein the common electrode further includes at least one second common electrode section disposed in the transmissive region along the second direction, and the second common electrode section is substantially disposed under a tilted surface of the adjusting layer.

9. The pixel structure of claim 5, wherein the reflective electrode substantially covers the adjusting layer.

10. The pixel structure of claim 1, wherein the transmissive electrode is disposed under the reflective electrode.

11. The pixel structure of claim 1, wherein the transmissive electrode is disposed on the reflective electrode.

12. The pixel structure of claim 1, wherein the reflective electrode includes a connecting electrode electrically connected to the transmissive electrode.

13. The pixel structure of claim 1, further comprising a dielectric layer disposed between the transmissive electrode and the common electrode, wherein the transmissive electrode, the dielectric layer, and the common electrode form a storage capacitor.

14. The pixel structure of claim 1, wherein the first direction is substantially perpendicular to the second direction.

15. A transflective liquid crystal display panel, comprising:
   a first substrate having a plurality of pixel regions, each of the pixel regions including a reflective region and a transmissive region;
   a plurality of data lines disposed on the first substrate along a first direction, each of the data lines including a first data line section and a second data line section, wherein the first data line section and the second data line section are electrically connected to each other through a contact via;
   a plurality of scan lines disposed on the first substrate along a second direction;
   a plurality of common electrodes disposed on the first substrate, each of the common electrodes including at least one first common electrode section disposed in each of the transmissive regions along the first direction; and the first common electrode section and the corresponding second data line section are substantially overlapped,
   wherein the scan lines and the second data line sections are made of a first conductive layer, and the first data line sections and the common electrodes are made of a second conductive layer;
   a plurality of transmissive electrodes respectively disposed in each of the transmissive regions of the pixel regions, wherein the transmissive electrode and the common electrode in the same pixel region are electrically disconnected to each other and are at least partially overlapped;
   a plurality of reflective electrodes respectively disposed in each of the reflective regions of the pixel regions, wherein the reflective electrode and the transmissive electrode in the same pixel region are electrically connected to each other;
   a plurality of thin film transistors, each of the thin film transistors respectively electrically connected to each of the corresponding scan lines and each of the corresponding data lines;

a second substrate disposed opposite to the first substrate; and a liquid crystal layer disposed between the first substrate and the second substrate.

16. The transflective liquid crystal display panel of claim 15, wherein each of the common electrodes further includes at least one second common electrode section disposed in the transmissive region along the second direction, and the second common electrode section is electrically connected to the first common electrode section.

17. The transflective liquid crystal display panel of claim 16, wherein the first common electrode section and the second common electrode section of each of the common electrodes substantially surrounds the transmissive region.

18. The transflective liquid crystal display panel of claim 15, further comprising a plurality of adjusting layers respectively disposed in each of the reflective regions, and each of the reflective electrodes disposed over each of the adjusting layers.

19. The transflective liquid crystal display panel of claim 18, wherein each of the adjusting layers having a rough surface, thereby each of the reflective electrodes having a rough surface.

20. The transflective liquid crystal display panel of claim 18, wherein each of the reflective electrodes at least exposes a tilted surface of the corresponding adjusting layer.

* * * * *